US00RE38236E

(19) United States
(12) Reissued Patent
Kubota et al.

(10) Patent Number: US RE38,236 E
(45) Date of Reissued Patent: Aug. 26, 2003

(54) DIGITAL SIGNAL TRANSMITTING METHOD, DIGITAL SIGNAL RECEIVING APPARATUS, AND RECORDING MEDIUM AND METHOD

(75) Inventors: Yukio Kubota, Kanagawa (JP); Koichi Goto, Kanagawa (JP)

(73) Assignee: Sony Corporation, Tokyo (JP)

(21) Appl. No.: 09/511,672

(22) Filed: Feb. 23, 2000

Related U.S. Patent Documents

Reissue of:
(64) Patent No.: 5,721,778
Issued: Feb. 24, 1998
Appl. No.: 08/545,032
Filed: Oct. 19, 1995

(30) Foreign Application Priority Data

Oct. 28, 1994 (JP) ..... 6-289139
Jan. 25, 1995 (JP) ..... 7-030056

(51) Int. Cl.[7] ..... H04L 9/00
(52) U.S. Cl. ..... 380/45; 380/47
(58) Field of Search ..... 380/45, 47

(56) References Cited

U.S. PATENT DOCUMENTS 4,677,434 A 6/1987 Fascenda
4,677,552 A 6/1987 Sibley, Jr.
4,802,217 A * 1/1989 Michener ..... 380/47
5,282,249 A 1/1994 Cohen et al.
5,341,425 A * 8/1994 Wasilewski et al. ..... 380/45
5,406,626 A 4/1995 Ryan
5,420,866 A * 5/1995 Wasilewski ..... 380/10
5,544,161 A * 8/1996 Bigham et al. ..... 370/397
5,590,202 A * 12/1996 Bestler et al. ..... 380/20
5,751,805 A * 5/1998 Otsuki et al. ..... 380/45
5,917,915 A 6/1999 Hirose

FOREIGN PATENT DOCUMENTS

EP 0 506 435 * 9/1992
EP 0 619 677 * 10/1994
WO WO 94/10802 * 5/1994

OTHER PUBLICATIONS

Proceedings from Eleven Technical Sessions of the Annual Convention and Exposition of the National Cable Television Association, San Francisco, Jun. 6–9, 1993, No. Convention 42, Jun. 6, 1993, Rutkowski, K., pp. 123–127, XP 000410491, Stubbs, G.S., "Conditional Access for Compression Systems: Desirable Attributes and Selection Criteria".*

* cited by examiner

*Primary Examiner*—Salvatore Cangialosi
(74) *Attorney, Agent, or Firm*—Frommer Lawrence & Haug LLP; Williams S. Frommer; Gordon Kessler

(57) ABSTRACT

A digital signal transmitting method, a digital signal receiving apparatus, and a recording medium which ensure the security of fee-charged software information. When an image providing predetermined services is transmitted, a band-compression coded digital video signal is given first-encryption processing and then the digital signal is further given encryption processing and transmitted. Therefore, double security can be added to the video signal and a digital signal transmitting method where its security is more firmly ensured can be realized.

28 Claims, 11 Drawing Sheets

DIGITAL SIGNAL TRANSMITTING METHOD, DIGITAL SIGNAL RECEIVING APPARATUS, AND RECORDING MEDIUM AND METHOD

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to a digital signal transmitting method, a digital signal receiving apparatus, and a recording medium, and is applicable, for example, to a digital signal transmitting system which provides fee-charged software information to contract users.

2. Description of the Related Art

In a conventional digital signal transmitting system using satellites or cables, as shown in FIG. 1, a program source PS, input to a digital signal transmitting apparatus, i.e., a broadcasting station 1, is band-compression coded with a moving picture image coding experts group (MPEG) method by means of an MPEG encoder 2 and is converted to packet transmission data by means of a packet generation section 3.

The packetized transmission data is multiplexed by a multiplexer 4, then the transmission data is scrambled for security by an encryption processing section 5, and finally keys (ciphers) are put over the scrambled data many times so that the scrambling cannot be descrambled easily. The encrypted transmission data is error corrected by a forward error correction (FEC) section 6 and modulated by a modulator 7. The modulated data is then sent through a digital satellite 8 directly to a digital signal receiving apparatus installed in a contract user's household, i.e., a terminal 10 (FIG. 2), or sent through the digital satellite 8 to a signal distributing station 9 (FIG. 2) which is called a head end. The data, transmitted to the signal distributing station 9, is sent to the terminal 10 via cable.

Now, as shown in FIG. 2, in the terminal 10, when the transmission data is directly sent via the satellite 8, the data is received by an antenna 11 and sent to a front end section 12. When the transmission data is sent from the signal distributing station 9 via the cable, it is inputted directly to the front end section 12. A user contracting with the broadcasting station 1 accesses a key authorized to each user to the terminal 10, with respect to the transmission data sent directly from the satellite 8 or from the satellite 8 via the signal distributing station 9, so that the user is authorized as a contract user and bill processing is performed, and at the same time, the user can appreciate desired software information.

That is, in the terminal 10, the transmission data is processed by the front end section 12 comprising a tuner, a demodulator, and an error corrector, and the processed data is input to a data fetch section 13. In the data fetch section 13, the multiplexed data is demultiplexed by the demultiplexer 14 so that the data is separated into a video signal, an audio signal, and data other than these signals. In a decryption section 15, ciphers are decrypted while performing bill processing. In a packet separation section 16, the decrypted data is packet separated. Finally, the compression of the data is expanded by an MPEG decoder 17, and the video and audio signals, which are digital-to-analog converted to analog signals, are output to television.

Incidentally, in the digital signal transmission system, when fee-charged software information such as video on demand or near video on demand is transmitted, a digital storage 18 such as tape media or disk media is incorporated into or connected to the terminal 10 to meet the convenience of users and to effectively utilize a digital transmission path. In such a case, large amounts of software data have been downloaded to the storage 18 by making use of an unoccupied time band and an unoccupied transmission path, and when the user looks at the software information at hand, the user accesses it with an ID card (for example, smart card) 19 to perform bill processing, and reproduction limitation is lifted.

More specifically, if the user accesses a central processing unit (CPU) 20 by means of the smart card 19, the CPU 20 performs an inquiry of registration to an authorization center 22 (FIG. 1) through a modem 21. The authorization center 22 confirms registration by means of a conditional access 23. If registration is confirmed, the authorization center 22 performs bill processing and also performs notification of confirmation to the CPU 20 through the modem 21.

The CPU 20 instructs decryption of key to a local conditional access 24 by this notification, and the local conditional access 24 decrypts a cipher which has been put over the data recorded on the storage 18. Hence, the reproduction limitation is lifted, and the packet of the data recorded on the storage 18 is separated by the packet separation section 16. The compression of the packet-separated data is decompressed (expanded) by the MPEG decoder 17 and then the expanded data is digital-to-analog converted to be output to television as the analog signal and audio signal A/V.

However, if, in the security system in a current broadcasting form, software information has been downloaded to the storage 18, as described above, to try to realize a system where this software can be appreciated when user wants to see it, then the following problems will arise.

More specifically, in the current digital signal transmitting system, when a cipher is decrypted by the decrypting section 15 and then software information is downloaded to the storage 18, as shown by point A in FIG. 3, fee-charged software cannot be downloaded to the storage 18 by decrypting the cipher without billing, because decrypting a cipher is, vis-a-vis, billing. Now, if only billing information is made free, all ciphers of data are decrypted, and downloaded to the storage 18, then a piece of software information is passed as it is and output from the terminal 10.

Also, in a case where the storage 18 is not incorporated into the terminal 10 but is connected to the terminal 10 and switching means is not provided between the decryption section 15 and the packet separation section 16, if ciphers are all decrypted and downloaded to the storage 18, then the decrypted data are all sent and there is the possibility that they can been seen for free at point C of FIG. 3 by persons other than contract users.

To solve these problems, data can be downloaded to the storage 18 before ciphers are decrypted, i.e., after multiplex is demultiplexed by the demultiplexer 14 (point B of FIG. 3). If, however, data are downloaded to the storage 18 after multiplex is demultiplexed by the demultiplexer 14, there is the problem that intra-coded (I) pictures can not be pulled out and can not be reproduced at variable speed, because data remain encrypted. Also, in broadcasting systems where data are encrypted, keys are changed annually or biennially to ensure security. Therefore, when a key is changed after software information is downloaded to the storage 18, there is the problem that ciphers cannot be decrypted and therefore the downloaded software information cannot be seen.

SUMMARY OF THE INVENTION

In view of the foregoing, an object of this invention is to provide a digital signal transmitting method, a digital signal receiving apparatus, and a recording medium which are capable of ensuring security when fee-charged software information is transmitted.

The foregoing object and other objects of the invention have been achieved by the provision of a digital signal transmitting method where at least a band-compression coded digital video signal is given encryption processing and transmitted, in which when an image providing predetermined services is transmitted, the band-compression coded digital signal is given first-encryption processing and then the first-encryption processed digital signal is further given the encryption processing and transmitted.

Also, according to the present invention, in the digital signal transmitting method where at least a band-compression coded digital video signal is given encryption processing and transmitted, the band-compression coded and encryption processed digital signal is mixed with the digital signal where the band-compression encoding has been completed within a predetermined image unit, and the mixed signal is transmitted.

In addition, according to the present invention, in a digital signal receiving apparatus 40 for receiving at least a band-compression coded digital video signal over which a first cipher is put and then a second cipher is put and which is transmitted by a broadcasting station, the digital signal receiving apparatus comprises second decrypting means 15, 19 for decrypting the second cipher put over the digital signal; recording/reproducing means 73, 74, 75, 76, 77 for recording the digital signal, where the second cipher was decrypted, on a recording medium, and also for reproducing the digital signal recorded on the recording medium; and first decrypting means 46, 91 for decrypting the first cipher of a reproduction signal that is reproduced from the recording medium.

Furthermore, in the present invention, there is provided a recording medium 101 wherein at least a band-compression coded digital video signal has been encrypted and recorded.

When an image providing predetermined services is transmitted, a band-compression coded digital video signal is given first-encryption processing and then the digital signal is further given encryption processing and transmitted. Therefore, double security can be added to the video signal so that a digital signal transmitting method where its security is more firmly ensured can be realized.

Further, at least a band-compression coded and first-encryption processed digital video signal are mixed with the digital signal where the band-compression encoding has been completed within a predetermined image unit in a broadcasting station 30. Therefore, variable-speed reproduction image can be viewed without performing variable-speed reproduction processing at a terminal 40.

When a first cipher and a second cipher are put over a digital signal where at least a video signal was the band-compression coded, and the digital signal which is transmitted by the broadcasting station 30 is received, the second cipher of the received digital signal is decrypted by the second decrypting means 15, 19 and the second decrypted digital signal is recorded on a recording medium by means of recording/reproducing means 73, 74, 75, 77. At the time of reproduction, the first cipher of the reproduction signal which is reproduced from the recording medium is decrypted by the first decrypting means 46, 91. Hence, a digital signal receiving apparatus 40 where its security is more firmly ensured can be realized.

Furthermore, there is provided a recording medium 101 wherein at least a band-compression coded digital video signal has been encrypted and recorded. With this, contract users are able to cheaply obtain the recording medium 101 where a plurality of pieces of encrypted software information are recorded, and are able to construct a new software information supply system where only information that users desire to see is billed and enjoyed.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Figure 1:
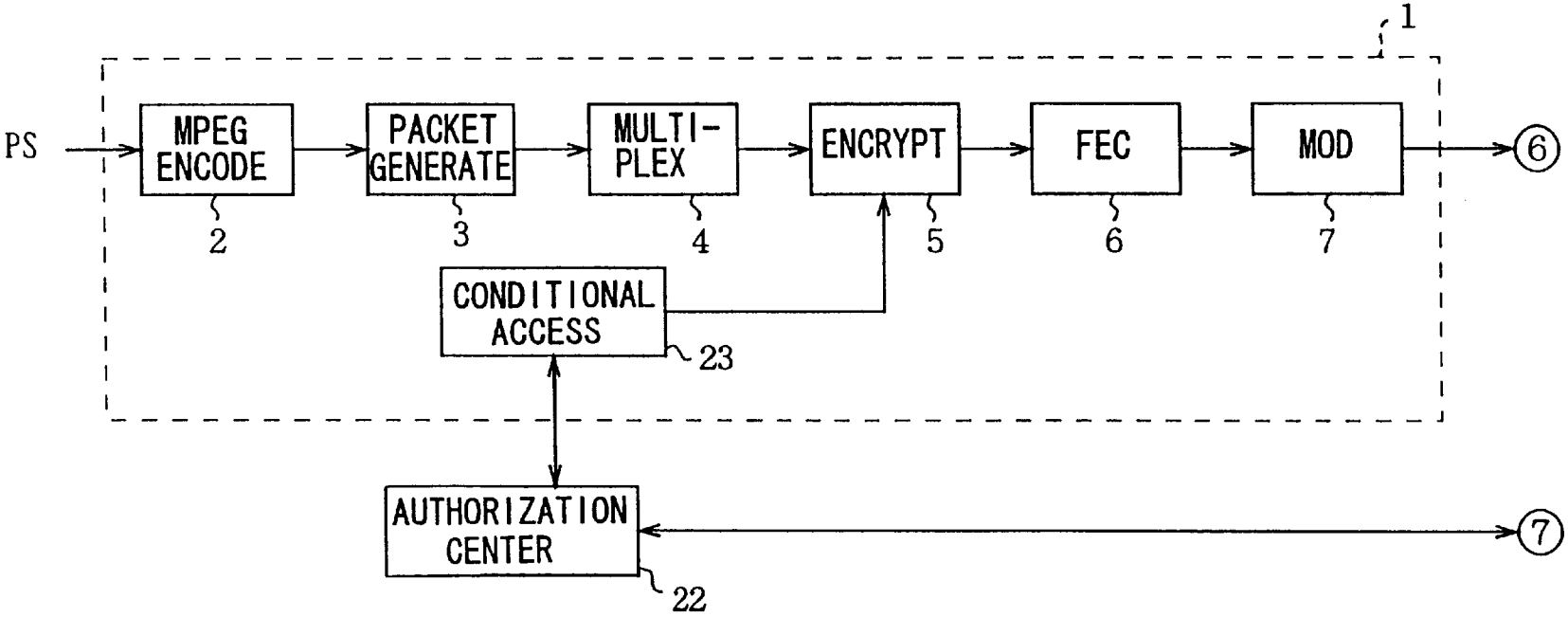
FIG. 1 (RELATED ART)
FIG. 1 is a block diagram showing the structure of a conventional digital signal transmitting apparatus.
Figure 4:
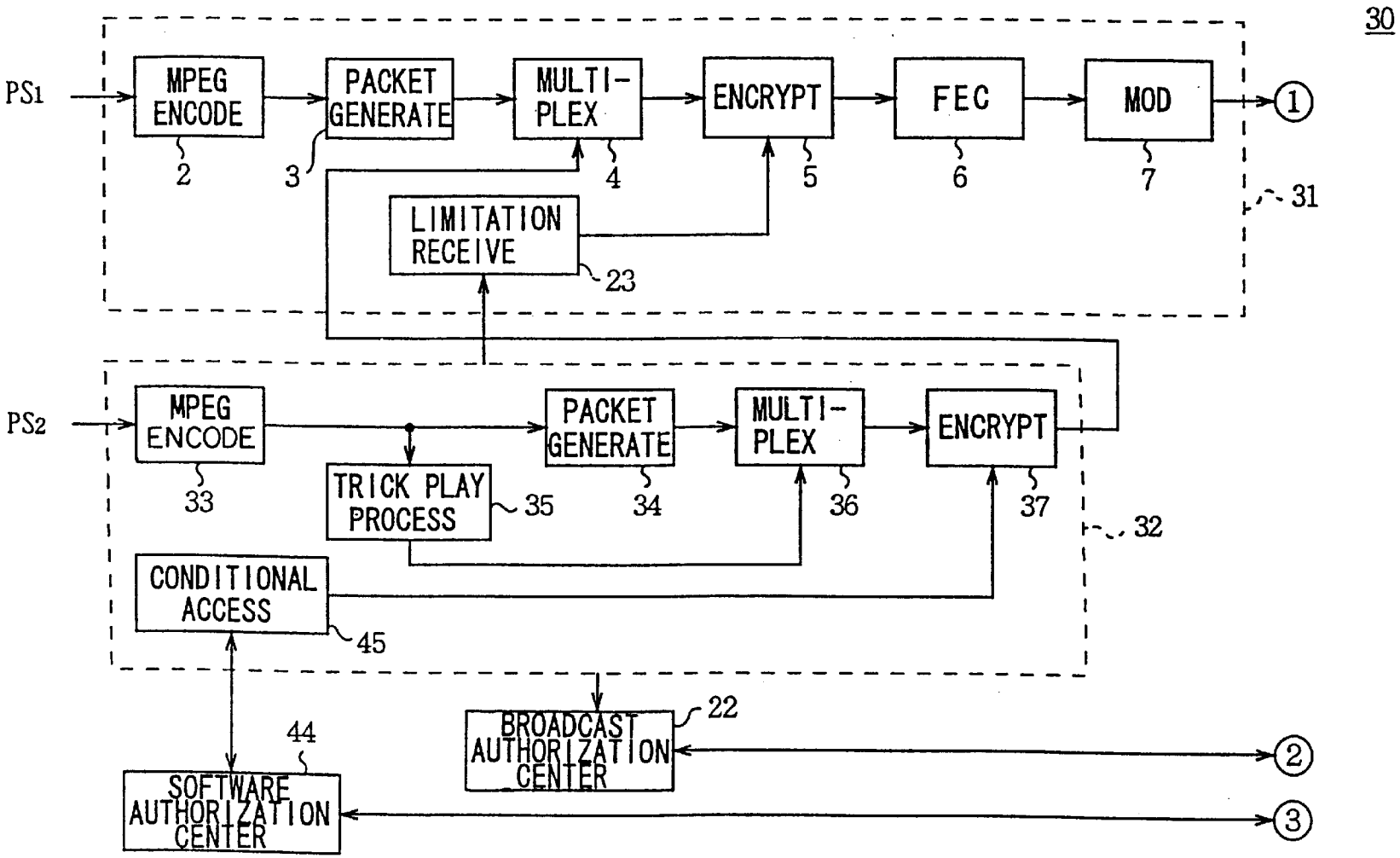
FIG. 4 is a block diagram showing the structure of a digital signal transmitting apparatus of an embodiment according to the present invention.

Preferred embodiments of this invention will be described with reference to the accompanying drawings:

(1) Structure of Digital Signal Transmitting Apparatus and Digital Signal Receiving Apparatus In FIG. 4 where the same reference numerals are applied to corresponding parts with FIG. 1, reference numeral 30 denotes a digital signal transmitting apparatus according to an embodiment of the present invention. In the digital signal transmitting apparatus 30, i.e., a broadcasting station, when predetermined services, for example, fee-charged software data are transmitted, twofold security is ensured by putting a cipher of a storage system over software data and further putting a cipher of a broadcasting system over the software data.

The digital signal transmitting apparatus 30 is constituted by a digital signal sending section 31 and a software supply section 32. In the digital signal transmitting apparatus 30, when fee-charged software information, for example, image software, music software, electronic program list, shopping information, game software, or education information is requested by users, as shown in FIG. 4, the software information as a program source $PS_2$ is input to the software supply section 32.

In the software supply section 32, the software data $PS_2$ comprising a digital signal is band-compression coded by means of an MPEG encoder 33. The band-compression coded digital signal is input to a packet generation section 34 and a trick play processing section 35. In the trick play processing section 35, variable-speed reproduction processing, i.e., processing for extracting an intra-coded (I) picture is performed for the video data. The extracted I picture is output to a multiplexer 36. Note that a technique for variable-speed reproducing an image which has been band-compression coded by an MPEG method is disclosed in Japanese Patent Application No. 287702/1993.

In the packet generation section 34, the input digital signal is packetized to video data, audio data, and other data. These packetized data are multiplexed by a multiplexer 36. In the multiplexer 36, an I picture is buried in the video data. A cipher of a storage system is put over the multiplexed digital signal by an encryption processing section 37, and the encrypted signal is sent to a multiplexer 4 of a rear sending section 31.

In the multiplexer 4, digital signals over which the ciphers of storage system were put are multiplexed. In an encryption processing section 5, a cipher of a broadcasting system is put over this multiplexed digital signal. Therefore, a cipher of a storage system and a cipher of a broadcasting system are put over the digital signal sent from the digital signal transmitting apparatus 30 in duplicate. In the sending section 31, key data that are added to programs are all common and broadcasting billing data is free of charge.

Figure 2:
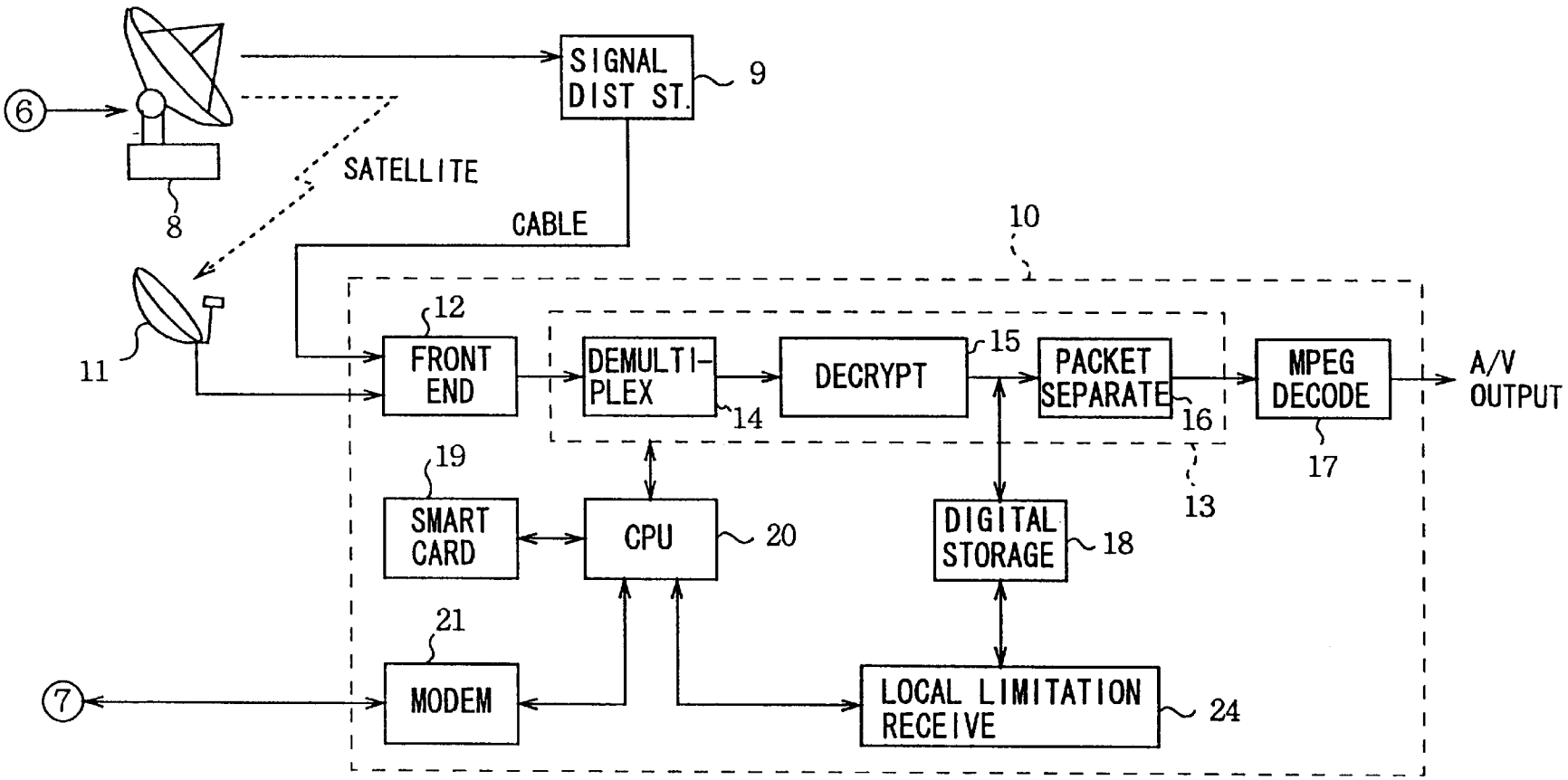
FIG. 2 (RELATED ART)
FIG. 2 is a block diagram showing the structure of a conventional digital signal receiving apparatus.
Figure 3:
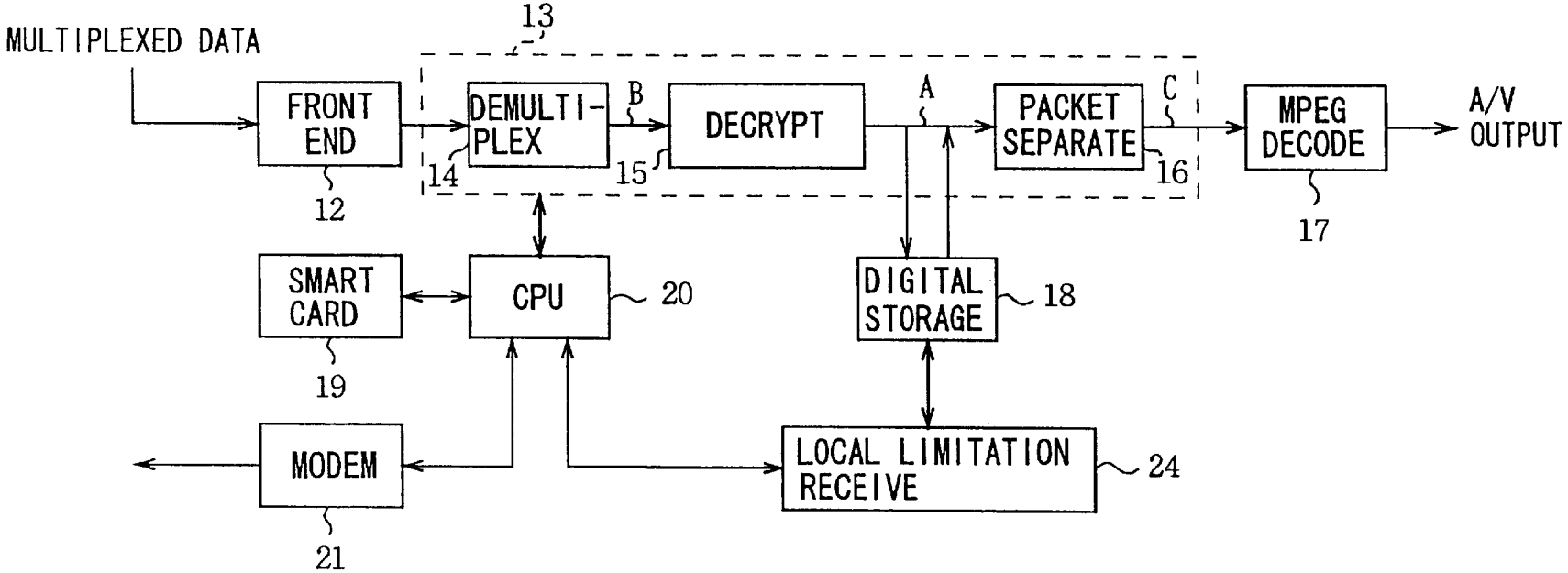
FIG. 3 (RELATED ART)
FIG. 3 is a block diagram explaining the problems occurring when, in the conventional digital signal receiving apparatus, software information is downloaded.
Figure 5:
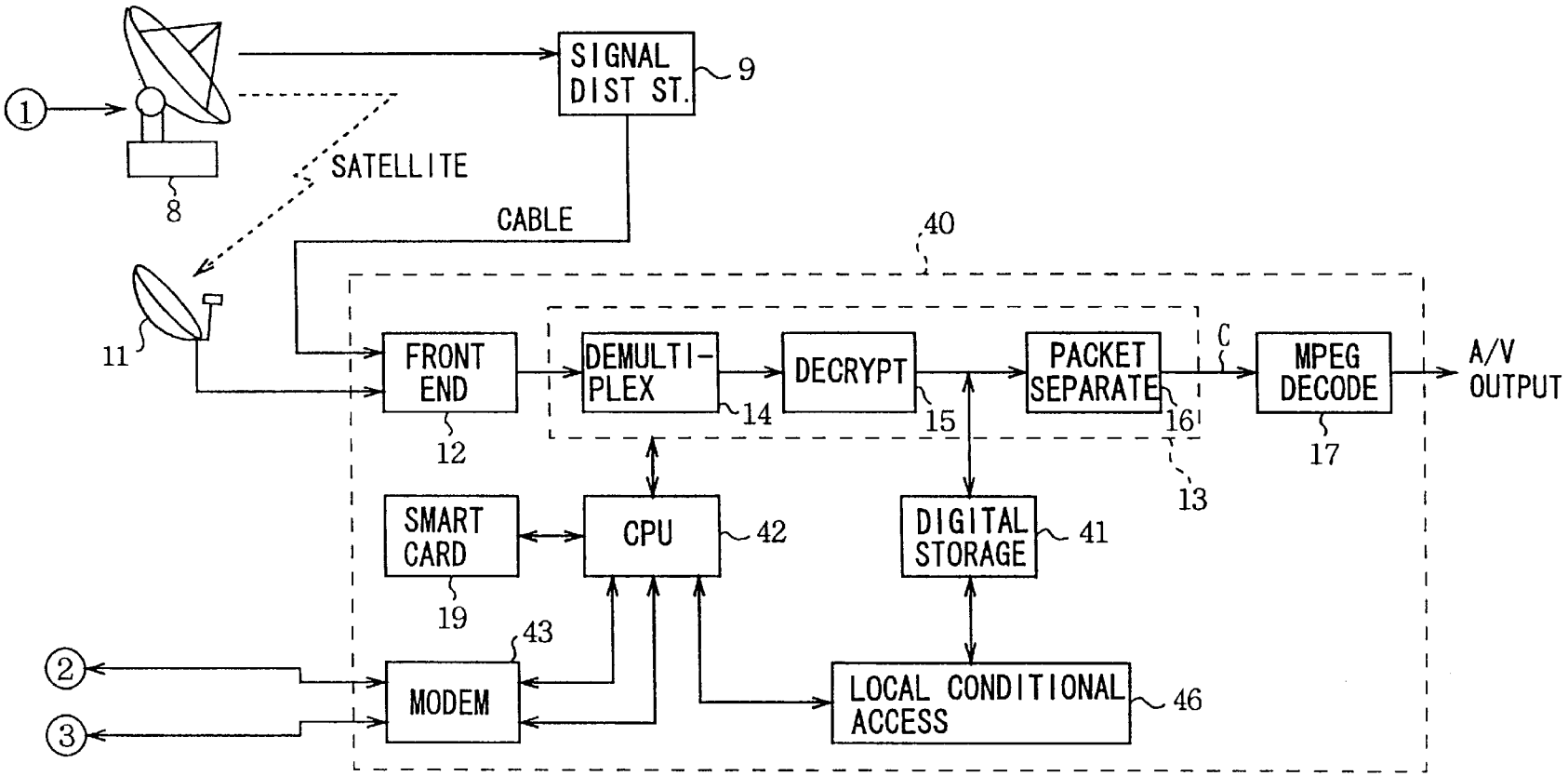
FIG. 5 is a block diagram showing the structure of a digital signal receiving apparatus of an embodiment according to the present invention.

This double security added digital signal is sent to a terminal installed in a household, i.e., a digital signal receiving apparatus 40 directly from a satellite 8 or by way of a signal distributing station 9 from the satellite 8, as shown in FIG. 5, where the same reference numerals are applied to corresponding parts with FIG. 2. In the digital signal receiving apparatus 40, the cipher of the broadcasting system, put over the transmitted digital signal, is decrypted by accessing a smart card 19, and the digital signal can be downloaded to a digital storage 41. That is, the cipher of the broadcasting system of the transmitted digital signal is decrypted by the decrypting section 15 and then the digital signal is recorded on the digital storage 41.

In this case, the digital signal which is downloaded to the digital storage 41 is recorded in the state where only the cipher of the storage system has been put over and also recorded in the state where variable-speed reproduction processing has been performed. Therefore, even if the key of the broadcasting system, added by the sending section 31, where changed, there would be no influence. Also, no image is viewed free of cost because the cipher of the storage system has been put over at point C of FIG. 5.

When a user desires to see the software information $PS_2$ downloaded to the storage 41, a CPU 42 performs an inquiry of registration to an authorization center 44 (FIG. 4) for software information through a modem 43, by inputting an ID number registered independently of the broadcasting system (for example, on the screen of a personal computer, put an ID number). The CPU 42 usually performs an inquiry of registration to a broadcasting-system authorization center 22 for the contact program $PS_1$ and performs an inquiry of registration to the software-system authorization center 44 for the software information $PS_2$. That is, the CPU 42 constructs two independent billing systems, a billing system for a broadcasting system and a billing system for a software system, by controlling the share of the modem 43.

The authorization center 44 sends the ID number to the conditional access 45 (FIG. 4) of the software supply section 32 and confirms registration. If the authorization center 44 confirms registration, then bill processing is performed and the CPU 42 instructs a local conditional access 46 to decrypt a cipher. The local conditional access 46 has a function of decrypting the cipher of the software system. Hence, the reproduction limitation of the storage 41 is lifted and the cipher is decrypted, so that the user is able to see software information by the same manipulation as a normal video tape recorder (VTR).

Figure 6:
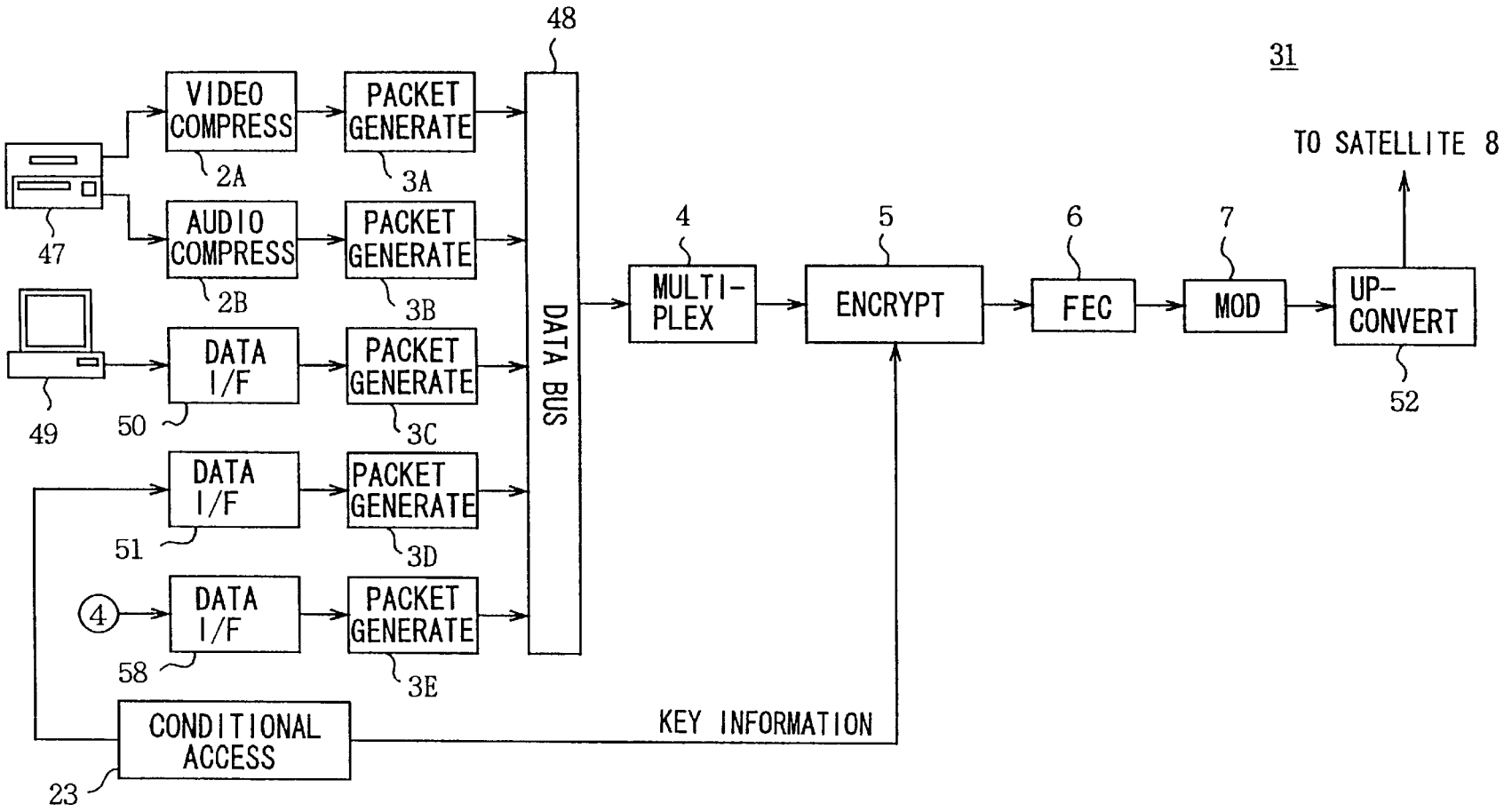
FIG. 6 is a block diagram showing the detailed structure of the sending section of the digital signal transmitting apparatus of the embodiment.
Figure 7:
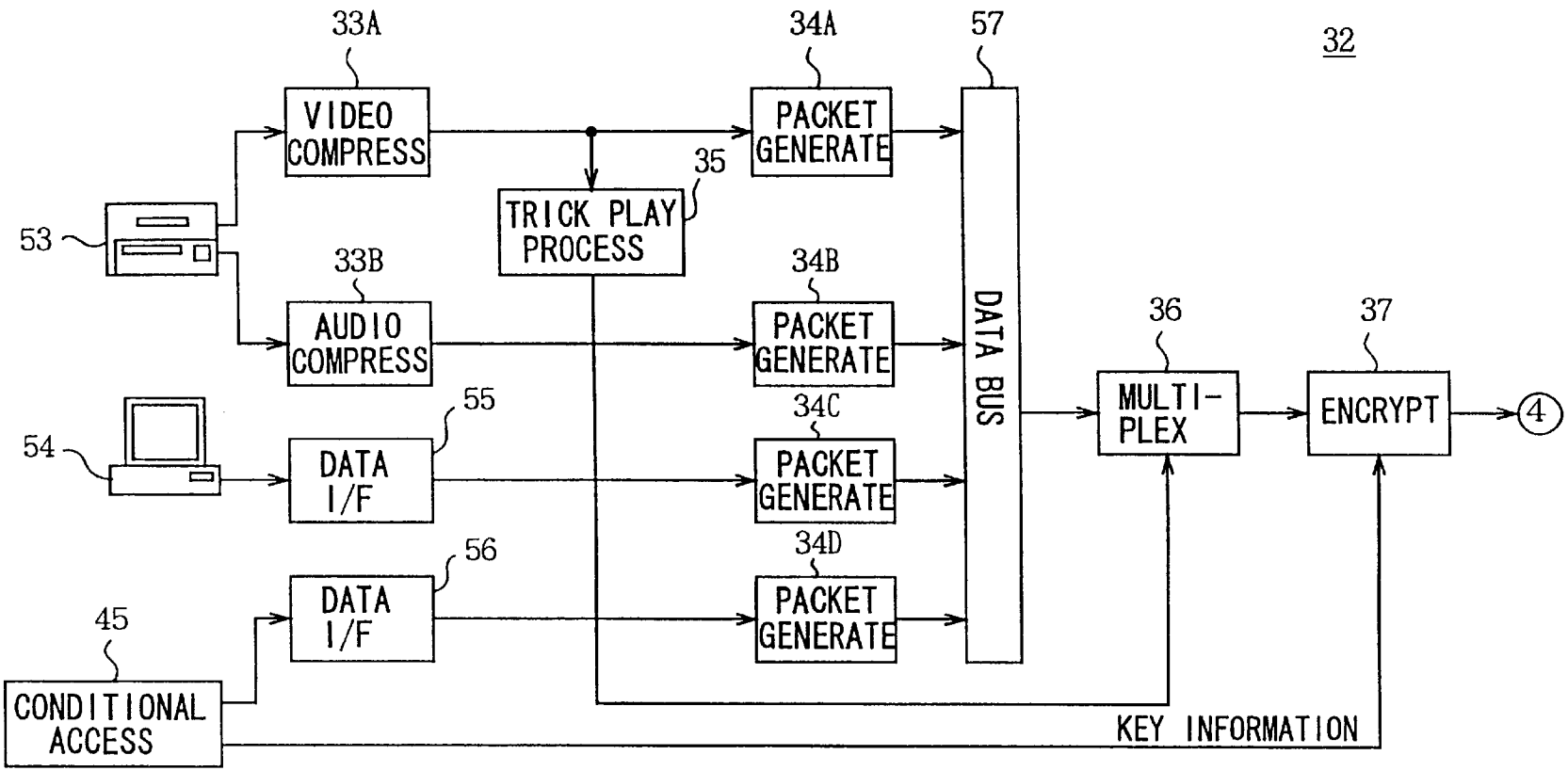
FIG. 7 is a block diagram showing the detailed structure of the software supply section of the digital signal transmitting apparatus of the embodiment.

(2) Structure of Digital Signal Transmitting Apparatus according to an Embodiment The detailed constructions of a sending section 31 and a software supply section 32 of a digital signal transmitting apparatus according to an embodiment of the present invention are shown in FIGS. 6 and 7, respectively. In this digital signal transmitting apparatus 30, when a normal contract program $PS_1$ is supplied, the program source $PS_1$ is input directly to the sending section 31, and when fee-charged software information $PS_2$ is supplied, the fee-charged software information $PS_2$ is supplied to the sending section 31 through the software supply section 32.

For the appreciation of the program $PS_1$, the video signal and the audio signal of a program, which is supplied, for example, from a digital VTR 47, are band-compression coded by means of MPEG encoders 2A and 2B and then are packetized for each video data and for each audio data by means of packet Generation sections 3A and 3B. The packetized video data and audio data are sent to a multiplexer 4 via a data bus 48. At the same time as this, for example, a personal computer 49 (hereinafter referred to as a "PC") sends data other than video data and audio data to a packet generation section 3C through a data interface (data I/F) 50 to be packetized. The packetized data from the packet generation section 3C is then sent through the data bus 48 to the multiplexer 4.

Also, a conditional access 23 sends key data through a data I/F 51 to a packet generation section 3D to packetize it, and the packet key data from the packet generation section 3D is sent through the data bus 48 to the multiplexer 4. The conditional access 23 further sends key information for encrypting software data to an encryption processing section 5. In the multiplexer 4, the video data, the audio data, and other data are multiplexed. The encryption processing section 5 puts a cipher over this multiplexed data, based on the key information input from the conditional access 23. The encrypted data is error corrected by a FEC section 6. The error-corrected data is modulated by a modulator 7 and then transmitted to a satellite 8 via an up-converter 52.

When, on the other hand, fee-charged software information $PS_2$ is transmitted, the video signal and the audio signal of the software information $PS_2$ which is output, for example, from a digital VTR 53 are band-compression coded by means of MPEG encoders 33A and 33B, respectively. The band-compression coded video signal is input to a packet generation section 34A and a trick play processing section 35. The packet generation section 34A packetizes the input video signal. The trick play processing section 35 extracts an I picture from the input video signal and then outputs the I picture to a multiplexer 36.

The band-compression coded audio signal is input to a packet Generation section 34B, which packetizes the audio signal. Also, General data other than video data and audio data, input from the PC 54, is input through a data I/F 55 to a packet generation section 34C. In addition, the conditional access 45 sends key data to a packet generation section 34D through a data I/F 56 and also sends key information for storage system to the encryption processing section 37.

The packetized data from the packet generation sections 34A to 34D are multiplexed by the multiplexer 36 through the data bus 57 and also the I picture is buried in video data. An encryption processing section 37 encrypts the multiplexed data, based on the key information input from the conditional access 45, and outputs the encrypted data to the packet generation section 3E of the sending section 31 through a data I/F 58 (FIG. 6). The packetized data from the packet generation section 3E is sent through the data bus 48 to the multiplexer 4 to be multiplexed, and then sent to the encryption processing section 5. In the encryption processing section 5, a cipher of the broadcasting system is put over the multiplexed data. The encrypted data is processed by the FEC section 6, the modulator 7, and the up-converter 52. The thus processed data is transmitted to the terminal 40 directly from the satellite 8 or by way of the signal distribution station 9 from the satellite 8.

(3) Structure of Digital Signal Receiving Apparatus according to an Embodiment

Figure 8:
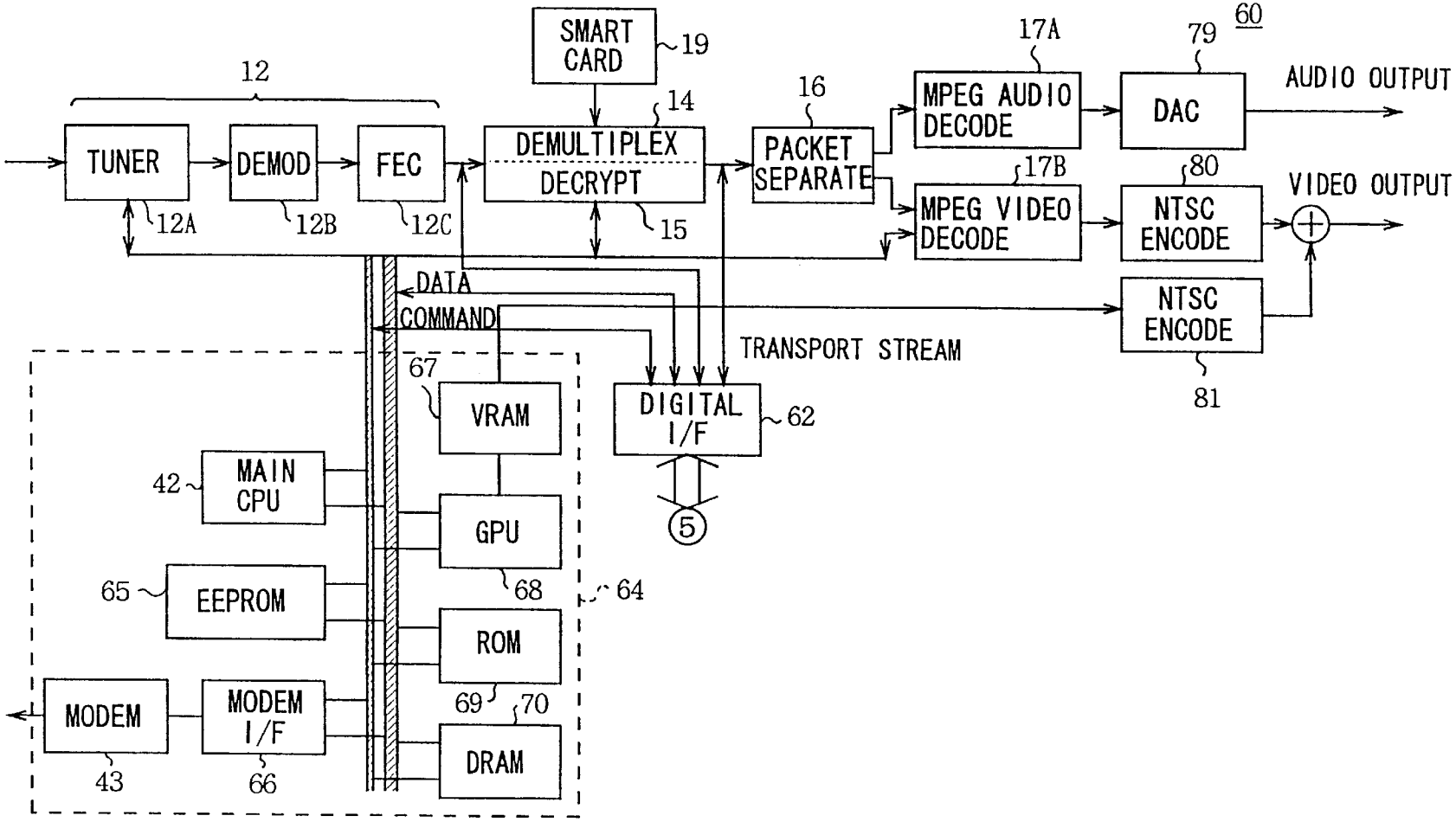
FIG. 8 is a block diagram showing the detailed structure of the receiving section of the digital signal receiving apparatus of the embodiment.
Figure 9:
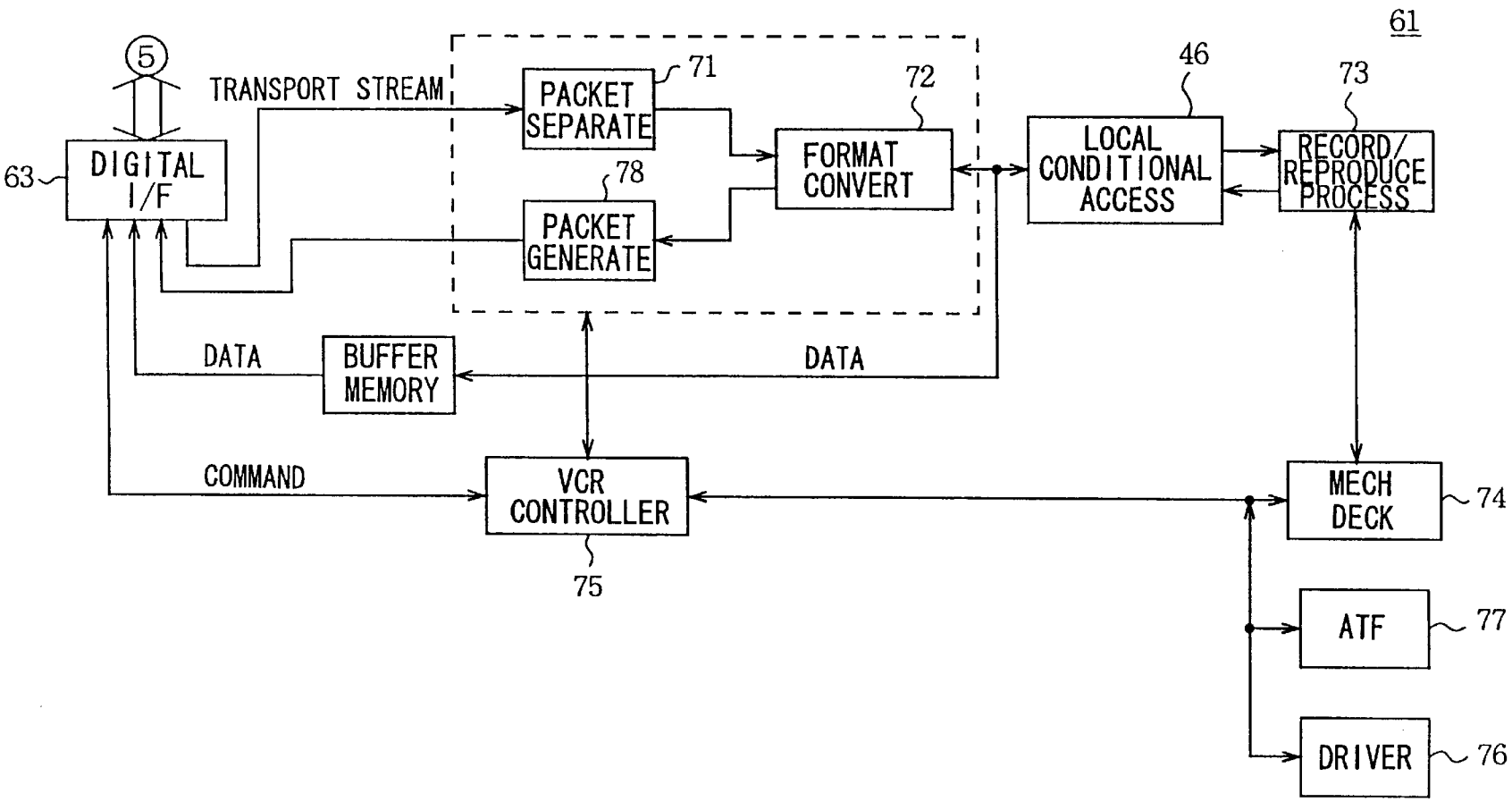
FIG. 9 is a block diagram showing the detailed structure of the recording/reproducing section of the digital signal receiving apparatus of the embodiment.

As shown in FIGS. 8 and 9 where the same reference numerals are applied to corresponding parts with FIG. 5, the digital signal receiving apparatus 40 according to an embodiment of the present invention is constituted by a receiving section 60 (FIG. 8) for receiving a digital signal which is sent by the digital signal transmitting apparatus 30 and a recording/reproducing section 61 (FIG. 9) for recording and reproducing the signal received by the receiving section 60 on and from a recording medium. In this embodiment, the receiving section 60 and the recording/reproducing section 61 are interconnected by way of digital interfaces (digital I/F) 62 and 63.

In the receiving section 60, the digital signal which is transmitted directly from the satellite 8 or by way of the signal distributing station 9 from the satellite 8 is input to a tuner 12A as a compressed digital signal. The tuned digital signal is demodulated by a demodulator 12B and error corrected by an FEC section 12C. The error-corrected signal is then input to a decrypting block comprising a demultiplexer 14 and a decrypting section 15. In the decrypting block, the cipher of the broadcasting system is decrypted with a private key which only a registered user can have.

The general data where the cipher of the broadcasting system was decrypted and the video data where a plurality of program channels were time-division multiplexed at units of packet of predetermined byte length are sent to a packet separation section 16 or the recording/reproducing section 61. A path leading to the packet separation section 16 and a path leading to the recording/reproducing section 61 are switched by switching means (not shown). In this embodiment, the switching means has been switched to the recording/reproducing section 61. The general data used herein includes text data, font data, video data, graphic data, and moving picture video data for administering a user's interface on a TV monitor.

The general data is input through a data port to a CPU block 64 which performs interactive processing. The CPU block 64 comprises a main CPU 42, an electrically erasable programmable read only memory (EEPROM) 65, a modem interface (modem I/F) 66, a modem 43, a video random access memory (VRAM) 67, a graphic processor unit (GPU) 68, a read only memory (ROM) 69, and a dynamic random access memory (DRAM) 70. In the case of hard-disk incorporated systems, general data is stored through a CPU bus in a hard disk once. The CPU 42 processes these general data in accordance with instructions externally manipulated by a controller, and necessary display data is output.

On the other hand, the video data is input through the digital I/F 62 and the digital I/F 63 to the recording/reproducing section 61 and then the video data is packetized and separated by a packet separation section 71. The packetized separated data is given time base corrector (TBC) processing and the format is converted by a format converting section 72. The format converted data is error corrected and modulated by way of a local conditional access 46. The modulated data is then recorded on the recording medium of a mechanical deck 74 by means of a record/reproduction processing section 73. Note that tapes and disks can be used as a recording medium. For example, there are digital VCRs, digital video disks (DVD), hard disks, and mini-floppy disks.

If a user instructs reproduction, a command is input from the CPU 42 through the digital I/F 62 and the digital I/F 63 to a VCR controller 75. The VCR controller 75, based on this command, drives the mechanical deck 74 by a driver 76. Thereby, a search is made up to a desired absolute address on the recording medium and a tracking operation is performed by an automatic tracking following unit (ATF) 77. As a result, data, recorded on the recording medium, is reproduced by the record/reproduction processing section 73. Note that the absolute address may be added in advance to transmission data, or may be added within the digital signal receiving apparatus 40.

The reproduction signal, reproduced by the record/reproduction processing section 73, is demodulated and then the cipher of the storage system is decrypted by the local conditional access 46. The decrypted reproduction signal is error corrected and the format is converted by the format converting section 72. The format converted reproduction signal is packetized by the packet generation section 78 and is sent through the digital I/F 63 and the digital I/F 62 to the packet separation section 16, in which the packet is separated. For the packet separated reproduction signal, the compression of the audio signal and the compression of the video signal are decompressed by an MPEG audio decoder 17A and an MPEG image decoder 17B, respectively.

The decompressed audio signal is converted to an analog signal by a digital-to-analog converter (DAC) 79 and is output. The decompressed video signal is encoded by a national television system committee (NTSC) encoder 80. Also, general data on a user interface is input from the CPU block 64 to an NTSC encoder 81. The general data, encoded with the aforementioned encoder 81, is added to the video signal which is output from the encoder 80, and the general data is output.

In a case where in the foregoing structure the software information $PS_2$ is transmitted to the digital signal receiving apparatus 40, in the software supply section 32, a cipher of a software system is put over the software information $PS_2$ and then in the sending section 31 a cipher of a broadcasting system is put over, and with this double security ensured, the software information is transmitted to the digital signal receiving apparatus 40. In the digital signal receiving apparatus 40, the cipher of the broadcasting system is decrypted and then the software information $PS_2$ is recorded on the digital storage 41. When a user sees the software information $PS_2$ recorded on the digital storage 41, registration is confirmed by the authorization center 44. If registration is confirmed, the cipher of the software system is decrypted and the software information $PS_2$ can be seen.

According to the foregoing structure, the key data of the broadcasting system are rendered all common and also the billing data by broadcasting is rendered free, and the software information $PS_2$ over which a cipher of the broadcasting system and a cipher of the software system are put in duplicate is transmitted when the software information $PS_2$ is supplied to the digital signal receiving apparatus 40. In the digital signal receiving apparatus 40, the cipher of the broadcasting system is decrypted and then the software information $PS_2$ is downloaded on the digital storage 41. Therefore, security can be ensured because the cipher of the software system has been put over the software information $PS_2$ when downloading the software information $PS_2$ to the digital storage 41.

Also, according to the above-mentioned structure, the switching means, which switches the path leading to the packet separation section 16 and the path leading to the recording/reproducing section 61, is provided, so that a digital signal transmitting system having both of the advantages of a video on demand and the advantages of a VTR can be provided to contract users.

Also, according to the above-mentioned structure, the software information $PS_2$ is given variable-speed reproduction processing in the software supply section 32 and then transmitted to the digital signal receiving apparatus 40, so that contract users are able to reproduce the software information $PS_2$ recorded on the storage 41 at variable speed.

Also, according to the above-mentioned structure, users are able to see, among a plurality of pieces of software information $PS_2$ downloaded, only desired software information at a desired time because a plurality of pieces of fee-charged software information $PS_2$ can be downloaded to the storage 41 of the terminal 40 by making use of an unoccupied time band of a transmission path and an unoccupied transmission path. In other words, each time desired software information $PS_2$ is selected, bill processing is performed and the reproduction limitation of the storage 41 is lifted. This embodiment is also effective as a means for realizing the video on demand in a digital signal transmitting system which is not 1:1 as in the case of transmission by satellite.

Also, according to the above-mentioned structure, the switching between the access to the authorization center 22 managing the billing information on the normal contract programs $PS_1$ and the access to the authorization center 44 managing the billing information on the software information $PS_2$ is controlled by way of the modem 43, so that two independent billing systems, a billing system for a broadcasting system and a billing system for a software system, can be constructed.

(4) Structure of Digital Signal Transmitting System

Figure 10:
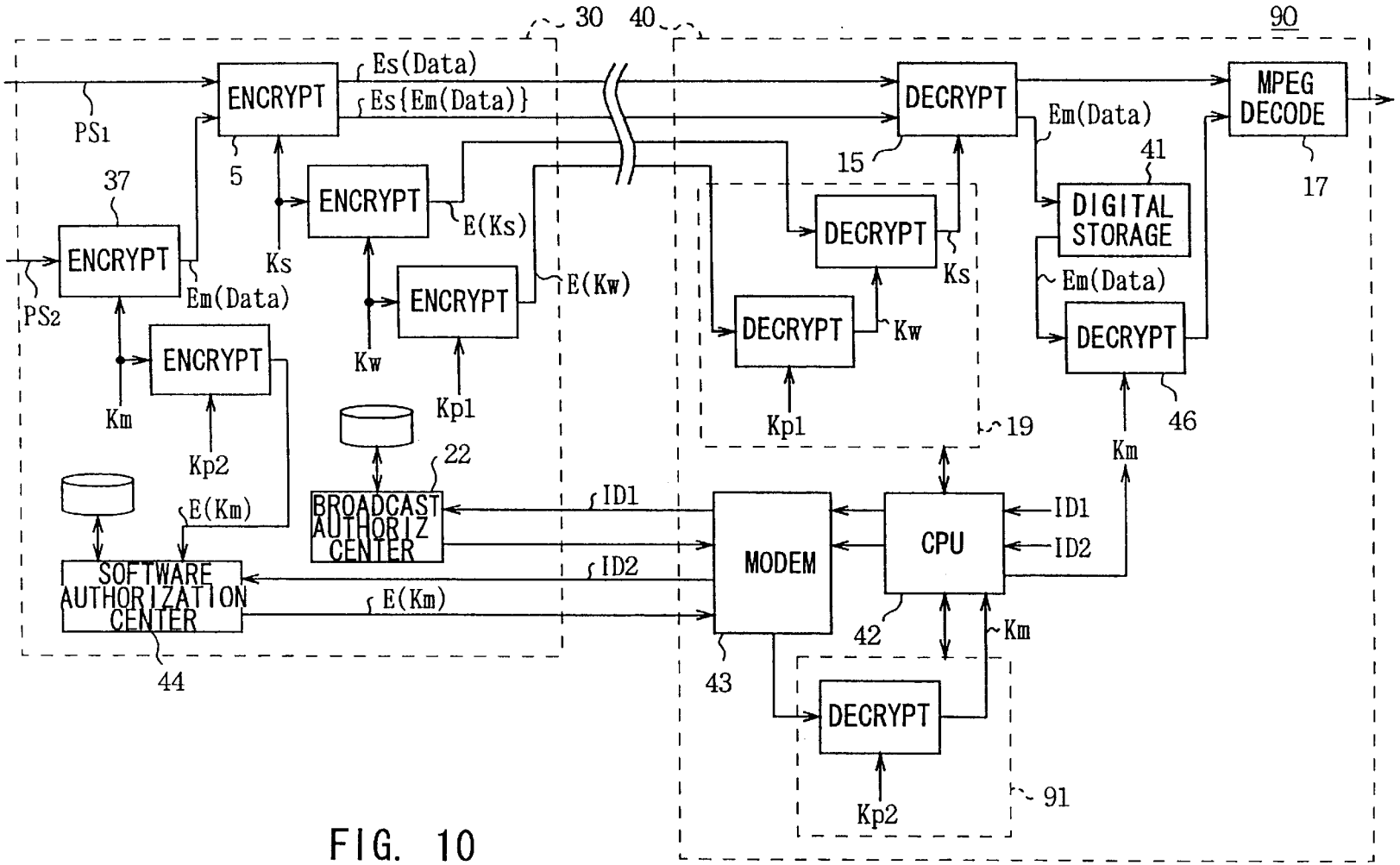
FIG. 10 is a block diagram showing the schematic structure of a digital signal transmitting system of the embodiment.

In FIG. 10 where the same reference numerals are applied to corresponding parts with FIGS. 4 and 5, reference numeral 90 denotes the schematic construction of a digital signal transmitting system of another embodiment of the present invention. In the digital signal transmitting system 90, twofold security is ensured when predetermined services, for example, fee-charged software information $PS_2$ is transmitted, by putting a cipher of the storage system over the software information $PS_2$ and further putting a cipher of the broadcasting system over that software information $PS_2$. Moreover, an encryption key Km, which is used when the cipher of the storage system is put over, is encrypted with a personal key Kp2 for software information use.

When a user sees the program source $PS_1$ transmitted by the digital signal transmitting apparatus 30, the user inserts the smart card 19 mailed from the broadcasting station 30 into the terminal 40 and inputs a registered ID number of broadcasting system, ID1. Hence, the CPU 42 performs an inquiry of registration to the authorization center 22 through the modem 43. If the registration of that user is confirmed, a program source Es (Data) over which a cipher of the broadcasting system was put is sent from the broadcasting station, i.e., the digital signal transmitting apparatus 30.

That is, in the broadcasting station 30, when the program source $PS_1$ is transmitted to the digital signal receiving apparatus 40, in the encryption processing section 5, a cipher of the broadcasting system is put over the program source $PS_1$ by means of an encryption key Ks. This encryption key Ks is encrypted with a work key Kw, and the work key Kw is encrypted with a personal key Kp1 of broadcasting system given to each user. Therefore, the encryption processing section 5 multiplexes the program source Es(Data) over which a cipher of the broadcasting system was put, and the encryption key E(Ks) and the work key E(Kw), and transmits the multiplexed data to the digital signal receiving apparatus 40.

The smart card 19 includes the personal key Kp1 which was used when encrypting the encryption key Km. Therefore, in the terminal 40, the cipher of the encrypted work key E(Kw) is decrypted by the personal key Kp1 and the cipher of the encryption key E(Ks) is decrypted by the decrypted work key Kw. Moreover, with the decrypted encryption key Ks, the cipher of the broadcasting system of the program source Es(Data) is decrypted. The decrypted program source $PS_1$ is decompressed by the MPEG decoder 17 and converted to an analog signal. The converted analog signal is output to a TV set.

When a user desires to download the software information $PS_2$ to the digital storage 41 (in this case, the above-mentioned switching means switches each time information is sent to the digital storage 41), the user inserts the smart card 19 into the terminal 40 and inputs a registered ID number of broadcasting system, ID1. Therefore, the CPU 42 performs an inquiry of registration to the authorization center 22 through the modem 43. If the registration of that user is confirmed, a program source Es {(Em(Data)} over which a cipher of the broadcasting system and a cipher of the software system were put is sent from the broadcasting station 30.

That is, in the encryption processing section 37 of the broadcasting station 30, a cipher of the storage system is put over the software information $PS_2$ by means of an encryption key Km for software information use. Also, this encryption key Km is encrypted with a personal key Kp2 for software information use, given to each user. The encrypted software data Em(Data) is sent to the encryption processing section 5, and the encrypted encryption key E(Km) is sent to the authorization center 44.

In the encryption processing section 5, a cipher of the broadcasting system is put over the software data Em(Data) over which a cipher of the software system was put, by means of the encryption key Ks. As described above, this encryption key Ks is encrypted with the work key Kw, and the work key Kw is encrypted with the personal key Kp1. The encryption processing section 5 multiplexes the software data Es{(Em(Data)} over which the cipher of the software system and the cipher of the broadcasting system were put in duplicate, and the encryption key E(Ks) and the work key E(Kw), and transmits the multiplexed data to the terminal 40.

In the terminal 40, the cipher of the broadcasting system of the doubly encrypted software data Es{Em(Data)} as described above is decrypted because the smart card 19 has been inserted in the terminal 40. The software data Em(Data) where the cipher of the broadcasting system was decrypted is recorded on the digital storage 41.

When a user sees the software data Em(Data) recorded on the digital storage 41, the user inserts the smart card 19 into the terminal 40 and inputs a registered ID number of software system, ID2. Thereby, the CPU 42 performs an inquiry of registration to the authorization center 44 through the modem 43. If the registration of the user is confirmed, bill processing is performed. Then, the encryption key E(Km) is input from the authorization center 44 through, for example, a telephone line and through the modem 43 to a smart card 91, and the cipher of the encryption key E(Km) is decrypted.

That is, the smart card 91 includes the personal key Kp2 which was used when encrypting the encryption key Km of software system. Therefore, the cipher of the encryption key E(Km) is decrypted by the personal key Kp2. The decrypted encryption key Km is sent through the CPU 42 to the decryption section 46.

In the decrypting section 46, the cipher of the software system, put over the software data Em(data), is decrypted by the encryption key Km, and the decrypted software data is sent to an MPEG decoder 17. In the MPEG decoder 17, the decrypted software data $PS_2$ is decompressed and then converted to an analog signal. The analog signal is then output to a TV set.

In the foregoing structure, when the software information $PS_2$ is transmitted to the digital signal receiving apparatus 40, a cipher of the software system is put over the software information $PS_2$ and then a cipher of the broadcasting system is put over and transmitted, and at the same time the encryption key Km, which was used when the cipher of the software system is put over, is encrypted with the personal key Kp2.

In the digital signal receiving apparatus 40, the cipher of the broadcasting system of the software data Es{(Em(Data)} is decrypted with the smart card 19 and then the decrypted software data is recorded on the digital storage 41. When the software data Em(Data), recorded on the digital storage 41, is seen, the cipher of the encryption key E(Km) is decrypted with the smart card 91. Also, the cipher of the software system, put over the software data Em(Data), is decrypted with the decrypted encryption key Km.

According to the foregoing structure, when transmitting the software information $PS_2$ is transmitted to the digital signal receiving apparatus 40, a cipher of the software system and a cipher of the broadcasting system are put over the software information $PS_2$, and the encryption key Km, used when the cipher of the software system is put over, is encrypted with the personal key Kp2. Therefore, the security of the software information $PS_2$ can be ensured more firmly.

Also, according to the above-mentioned structure, by incorporating the personal key Kp2 for decrypting the cipher of the encrypted encryption key E(Km) into the smart card 91, desired software information $PS_2$ can be seen at a desired time because users are able to decrypt with ease and reliability the cipher of the encryption key E(Km).

(5) Other Embodiment

The above-mentioned embodiments have been dealt with the case where a contract user has downloaded free-charged software information $PS_2$ to the storage 41 and where the user sees the software information $PS_2$ recorded on the digital storage 41 when the user desires to do so. However, the present invention is not limited to this, but as shown in FIG. 11, a package system 100 can be constructed with a software supply section 32 and a digital signal receiving apparatus 40, software information encrypted in the software supply section 32 is recorded on a recording medium and packaged, and this package software 101 can be sent to users periodically, for example, by the month.

Figure 11:
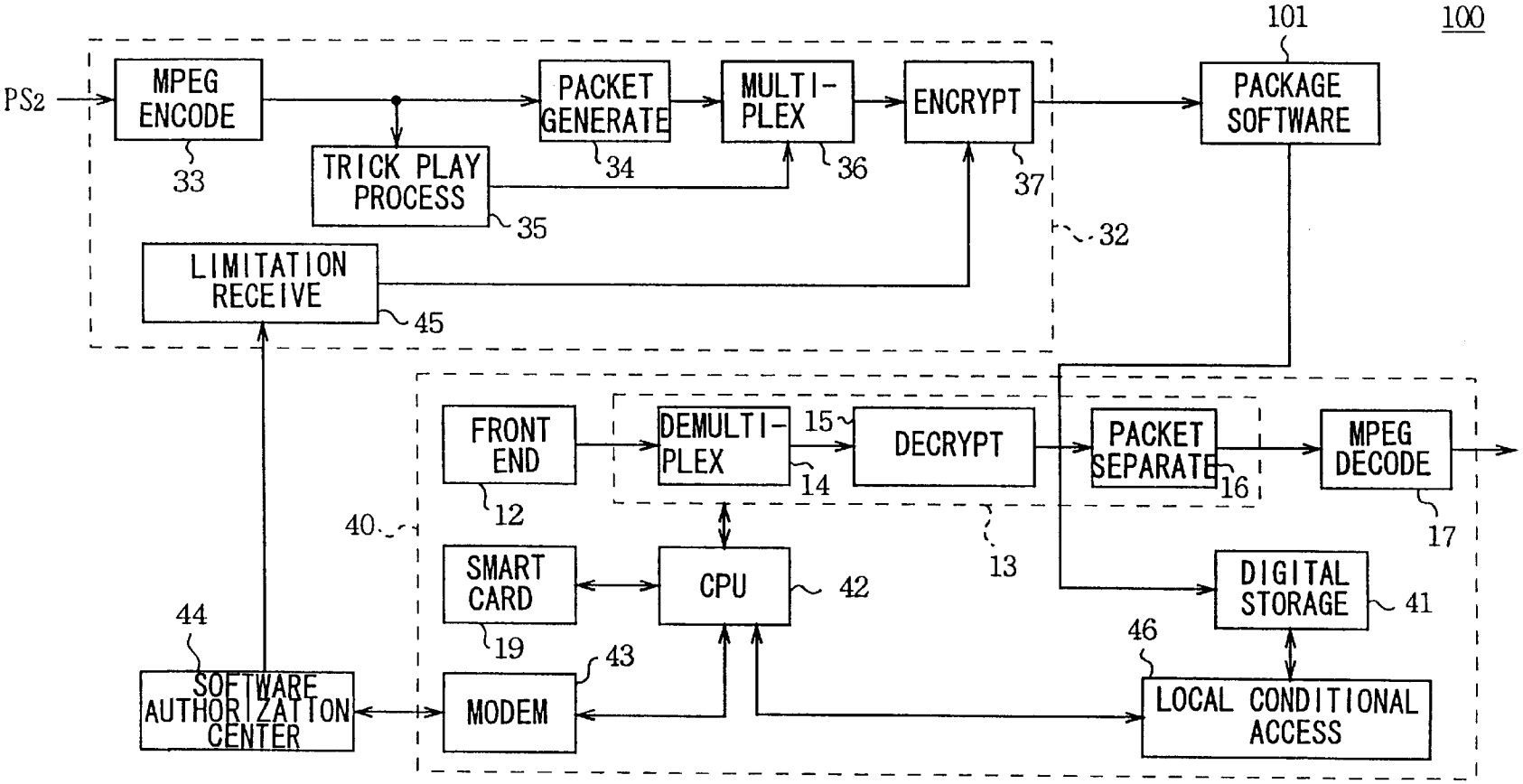
FIG. 11 is a block diagram explaining the software supply system of a package system.

In this case, as shown in FIG. 11, a billing system can be constructed only with the digital signal receiving apparatus 40. Also, by cheaply providing users with the software package 101 where a plurality of pieces of encrypted software information are recorded, there can be constructed a new software information supply system where pieces of software information are packaged, such as a system where only information that users desire to see is billed and enjoyed. Note that the package software 101 includes, for example, ten movies.

Further, the above-mentioned embodiments have been dealt with the case where the authorization center 22 for a broadcasting system and the authorization center 44 for a software system are provided and the share of the modem 43 is controlled by means of the CPU 42, so that two independent billing systems are constructed. However, the present invention is not limited to this, but the bill processing with respect to the programs of the broadcasting and software systems can be performed with a single authorization center.

Further, the above-mentioned embodiment have been dealt with the case that there was used the digital signal receiving apparatus 40 where the recording/reproducing section 61 is connected to the receiving section 60. However, the present invention is not limited to this, but it can use a digital signal receiving apparatus 40 into which the recording/reproducing section 61 is incorporated.

Further, the above-mentioned embodiment have been dealt with the case where variable-speed reproduction processing was performed in the software supply section 32. However, the present invention is not limited to this, but the variable-speed reproduction processing can be performed in the terminal, i.e., digital signal receiving apparatus 40.

Furthermore, the above-mentioned embodiment have been dealt with the case where the smart card 19 for seeing a general contract program source $PS_1$ and the smart card 91 for seeing software information $PS_2$ were individually provided. However, the present invention is not limited to this, but a single card can have both of the functions of the smart card 19 and the smart card 91.

Moreover, the above-mentioned embodiment have been dealt with the case where the software information $PS_2$ was downloaded to the digital storage 41. However, the present invention is not limited to this, but the software information $PS_2$ can be seen at real time. In such a case, the switching means is switched to the path leading to the packet separation section 16 and the smart cards 19 and 91 are inserted into the terminal 40. Therefore, the ciphers of broadcasting and software systems which have been put over the software information $PS_2$ are decrypted, and the software information $PS_2$ can be seen at real time.

Finally, the above-mentioned embodiment have been dealt with the case where an audio signal and an video signal are band-compression encoded and then transmitted to the digital signal receiving apparatus 40. However, the present invention is not limited to this, but only the video signal can be band-compression encoded and transmitted to the digital signal receiving apparatus 40.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A method for transmitting a digital signal, comprising the steps of:

band-compression coding a first digital signal and a second digital signal, each respective digital signal defining an image;

encrypting the band-compression coded first digital signal;

multiplexing the encrypted first digital signal and the band-compression coded second digital signal; and encrypting the multiplexed first and second digital signals to form said digital signal for transmission.

2. The method according to claim 1, wherein the band-compression coded first digital signal is encrypted with a first encryption key, and the multiplexed first and second digital signals are encrypted with a second encryption key.

3. Apparatus for transmitting a digital signal, comprising:

means for band-compression coding a first digital signal and a second digital signal, each respective digital signal defining an image;

means for encrypting the band-compression coded first digital signal;

means for multiplexing the encrypting first digital signal and the band-compression coded second digital signal; and means for encrypting the multiplexed first and second digital signals to form said digital signal for transmission.

4. Apparatus according to claim 3, wherein the band-compression coded first digital signal is encrypted with a first encryption key, and the multiplexed first and second digital signals are encrypted with a second encryption key.

5. Digital signal receiving apparatus for receiving a digital video signal formed by multiplexing an encrypted first digital signal and a band-compression coded second digital signal and by encrypting the multiplexed first and second digital signals, said digital video signal encrypted with a first and second encryption key and transmitted by a broadcasting station, comprising:

first-decryption means for decrypting said digital video signal encrypted with said first encryption key;

recording/reproducing means for recording the first-decrypted digital video signal on a recording medium and for reproducing the first-decrypted digital video signal from said recording medium; and second-decryption means for decrypting the reproduced first-decrypted digital video signal encrypted with said second encryption key.

6. Apparatus according to claim 5, wherein said broadcasting station comprises means for multiplexing said first digital signal and said second digital signal having a predetermined image band-compression coded, and means for encrypting the multiplexed first and second digital signals.

7. Apparatus according to claim 5, wherein during variable speed reproduction, and recording/reproducing means reproduces a variable-speed reproduction image defined by said digital video signal.

8. Apparatus according to claim 5, further comprising means for providing access to a plurality of management stations forming a billing system for processing billing information corresponding to predetermined services supplied by said digital video signal.

9. A recording medium comprising data recorded thereon, said data defined by a digital video signal formed by multiplexing an encrypted first digital signal and a band-compression coded second digital signal and by encrypting the multiplexed first and second digital signals.

*10. A method for transmitting a digital transmission signal, comprising the steps of:*

*providing a first digital signal and a second digital signal, wherein the first digital signal is digital software data for a digital software distribution service;*

*encrypting the first digital signal with a first encryption key; wherein said digital software data is to be stored on a storage medium at a receiver side in an encrypted form encrypted with the first encryption key to secure the stored digital software data;*

*multiplexing the encrypted first digital signal and the second digital signal; and*

*encrypting the multiplexed digital signals with a second encryption key to form said digital transmission signal and to secure the digital transmission signal.*

*11. The method according to claim 10, further comprising:*

*charging a software fee to a user when said encrypted digital software data is reproduced from said storage medium at said receiver side and decrypted with a decryption key corresponding to said first encryption key at said receiver side.*

*12. The method according to claim 10, wherein*

*said digital software data is one of video software, music software and game software.*

*13. A method for transmitting a digital transmission signal, comprising the steps of:*

*providing a digital signal, wherein the digital signal is digital software data for a digital software distribution service;*

*encrypting the digital signal with a first encryption key; wherein said digital software data is to be stored on a storage medium at a receiver side in an encrypted form encrypted with the first encryption key to secure the stored digital software data;*

*multiplexing with other signals said encrypted digital signal encrypted with said first encryption key; and*

*encrypting the encrypted digital signal with a second encryption key to form said digital transmission signal and to secure the digital transmission signal.*

*14. A method for transmitting a digital transmission signal, comprising the steps of:*

*providing a digital signal, wherein the digital signal is digital software data for a digital software distribution service;*

*encrypting the digital signal with a first encryption key;*

*encrypting the encrypted digital signal with a second encryption key to form said digital transmission signal and to secure the digital transmission signal; and*

*charging a software fee to a user when said encrypted digital software data is reproduced from said storage medium at said receiver side and decrypted with a decryption key corresponding to said first encryption key at said receiver side;*

*wherein said digital software data is to be stored on a storage medium at a receiver side in an encrypted form encrypted with the first encryption key to secure the stored digital software data.*

*15. A method for transmitting a digital transmission signal, comprising the steps of:*

*providing a digital signal, wherein the digital signal is digital software data for a digital software distribution service;*

*encrypting the digital signal with a first encryption key; wherein said digital software data is to be stored on a storage medium at a receiver side in an encrypted form encrypted with the first encryption key to secure the stored digital software data; and*

*encrypting the encrypted digital signal with a second encryption key to form said digital transmission signal and to secure the digital transmission signal;*

*wherein said digital software data is one of video software, music software and game software.*

*16. Digital transmission apparatus for transmitting a digital transmission signal, comprising:*

*means for providing a first digital signal and a second digital signal, wherein the fist digital signal is digital software data for a digital software distribution service;*

*a first encryption circuit for encrypting the first digital signal with a first encryption key; wherein said digital software data is to be stored on a storage medium at a receiver side in an encrypted form encrypted with the first encryption key to secure the stored digital software data;*

*a multiplexer for multiplexing the encrypted first digital signal and the second digital signal; and*

*a second encryption circuit for encrypting the multiplexed digital signals with a second encryption key to form said digital transmission signal and to secure the digital transmission signal.*

*17. Digital signal receiving apparatus for receiving a digital transmission signal formed by encrypting a digital signal with a first encryption key and by encrypting the encrypted digital signal with a second encryption key to secure the digital transmission signal, wherein the digital signal is digital software data for a digital software distribution service, said digital signal receiving apparatus comprising:*

*a decryption circuit for decrypting said digital transmission signal with a second decryption key corresponding to said second encryption key;*

*an extracting circuit for extracting said digital signal in an encrypted form, the extracted digital signal having been encrypted with said first encryption key;*

*an outputting circuit for outputting the extracted digital signal to a recording/reproducing circuit which is connected via a digital bus or provided in the digital signal receiving apparatus in order to record the extracted digital signal on a storage medium in an encrypted form; and*

*a communication circuit for communicating billing information with a billing center, wherein a software fee is charged to a user where said recorded digital signal is reproduced from said storage medium and decrypted with a first decryption key corresponding to said first encryption key.*

*18. A method for receiving a digital transmission signal formed by encrypting a digital signal with a first encryption key and by encrypting the encrypted digital signal with a second encryption key to secure the digital transmission signal, wherein the digital transmission signal is digital software data for a digital software distribution service, said method comprising the steps of:*

*decrypting said digital transmission signal with a second decryption key corresponding to said second encryption key;*

*extracting said digital signal in an encrypted form, the extracted digital signal having been encrypted with said first encryption key;*

*outputting the extracted digital signal to a recording/reproducing circuit which is connected via a digital bus or provided in a digital receiving apparatus in order to record the extracted digital signal on a storage medium in an encrypted form; and*

*communicating billing information with a billing center, wherein a software fee is charged to a user when said recorded digital signal is reproduced from said storage medium and decrypted with a first decryption key corresponding to said first encryption key.*

*19. A method of transmitting a digital signal, the method comprising the steps of:*

*compressing a first digital signal and a second digital signal;*

*encrypting said compressed first digital signal with a first encryption key (Km);*

*multiplexing the encrypted compressed first digital signal and compressed second digital signal;*

*encrypting the multiplexed first and second digital signals with a second encryption key (Ks);*

*receiving an inquiry to reproduce said first digital signal stored on a recording medium of a receiver;*

*confirming registration of a subscriber who owns said receiver in response to said inquiry;*

*performing a billing processing if said registration is confirmed; and*

*transmitting said first encryption key (Km) to said receiver after said billing processing is performed.*

*20. The method according to claim 19, further comprising:*

*encrypting said second encryption key (Ks);*

*wherein said multiplexing step multiplexes said first digital signal, second digital signal and said encrypted second encryption key (E(Ks)).*

*21. The method according to claim 19, further comprising:*

*encrypting said first encryption key (Km);*

*wherein said transmitting step transmits said encrypted first encryption key (E(Km)) to said receiver.*

*22. The method according to claim 19, wherein said receiving step receives said inquiry via telephone line.*

*23. The method according to claim 22, wherein said transmitting step transmits said first encryption key (Km) via telephone line.*

*24. Apparatus for transmitting a digital signal, the apparatus comprising:*

*means for compressing a first digital signal and a second digital signal;*

*means for encrypting said compressed first digital signal with a first encryption key (Km);*

*means for multiplexing the encrypted compressed first digital signal and compressed second digital signal;*

*means for encrypting the multiplexed first and second digital signals with a second encryption key (Ks);*

*means for receiving an inquiry to reproduce said first digital signal stored on a recording medium of a receiver;*

*means for confirming registration of a subscriber who owns said receiver in response to said inquiry;*

*means for performing a billing processing if said registration is confirmed; and*

*means for transmitting said first encryption key (Km) to said receiver after said billing processing is performed.*

*25. Apparatus according to claim 24, further comprising:*

*means for encrypting said second encryption key (Ks);*

*wherein said multiplexing means multiplexes said first digital signal, second digital signal and said encrypted second encryption key (E(Ks)).*

*26. Apparatus according to claim 24, further comprising:*

*means for encrypting said first encryption key (Km);*

*wherein said transmitting means transmits said encrypted first encryption key (E(Km)) to said receiver.*

*27. Apparatus according to claim 24, wherein said receiving means receives said inquiry via telephone line.*

*28. Apparatus according to claim 27, wherein said transmitting means transmits said first encryption key (Km) via telephone line.*

* * * * *